No. 753,141. PATENTED FEB. 23, 1904.
W. H. KERR.
EXTENSIBLE CHANDELIER.
APPLICATION FILED AUG. 19, 1903.
NO MODEL.
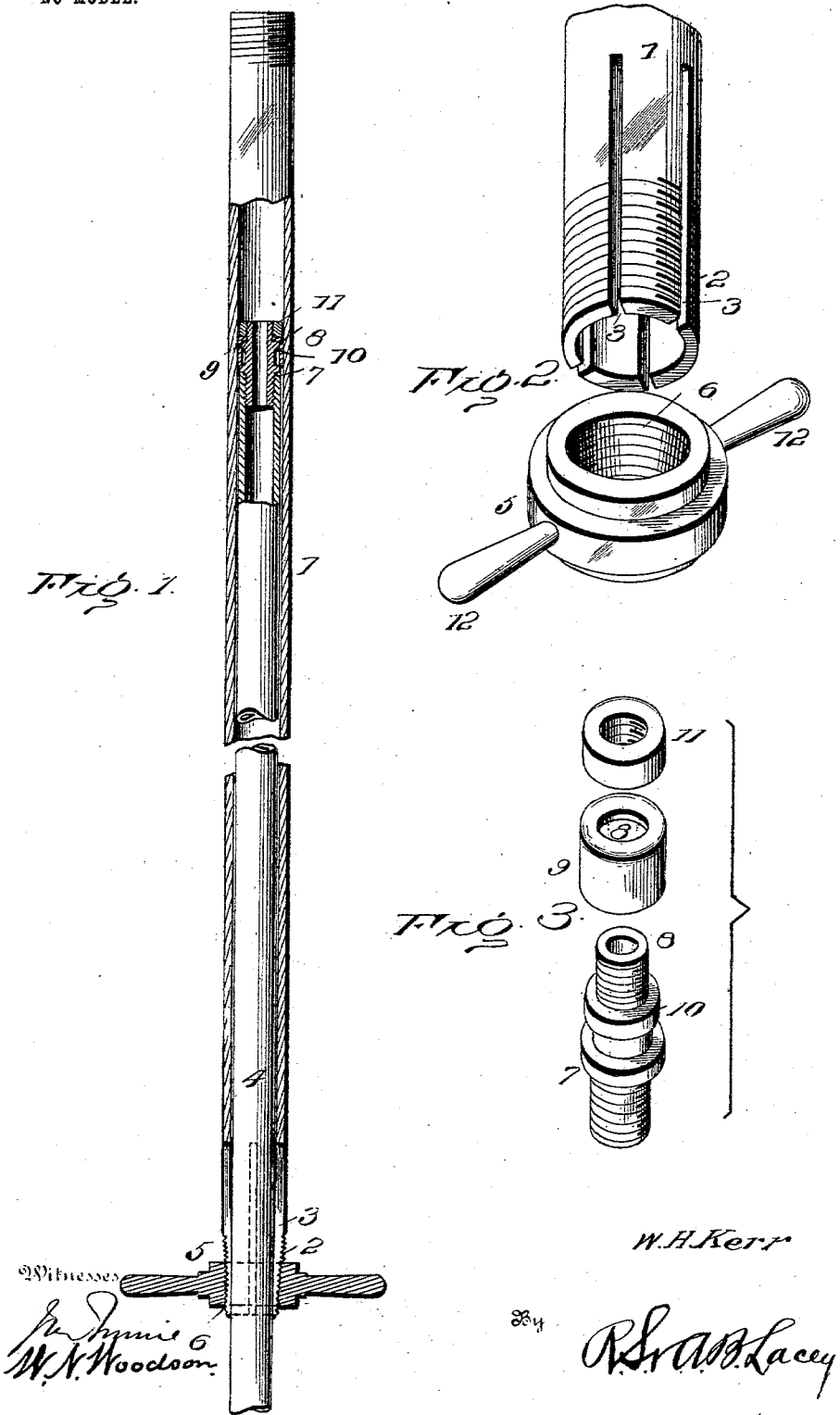
Inventor
W. H. Kerr
By R. S. & A. B. Lacey
Attorneys No. 753,141.

Patented February 23, 1904.

UNITED STATES PATENT OFFICE.

WARREN H. KERR, OF OLEAN, NEW YORK.

EXTENSIBLE CHANDELIER.

SPECIFICATION forming part of Letters Patent No. 753,141, dated February 23, 1904.

Application filed August 19, 1903. Serial No. 170,091. (No model.)

*To all whom it may concern:*

Be it known that I, WARREN H. KERR, a citizen of the United States, residing at Olean, in the county of Cattaraugus and State of New York, have invented certain new and useful Improvements in Extensible Chandeliers, of which the following is a specification.

This invention provides an extensible chandelier made in tubular sections adjustably mounted relative to each other so as to adapt the chandelier for use as a drop-light or for general lighting purposes.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a vertical sectional view through the chandelier-tubes, the lower portion of the slidable tube being broken away. Fig. 2 is a view showing the lower end portion of the fixed tube and the adjustment-collar separated. Fig. 3 is a combined view showing the bushing and adjacent parts.

Corresponding and like parts are referred to in the following description and indicated in all the views of the drawings by the same reference characters.

The lighting attachment, as before premised, comprises a fixed tube 1, having its upper end threaded so as to be attached to the service-pipe usually extended downwardly from the ceiling. The fixed tube 1 is also provided with a threaded lower end 2, this threaded end portion being provided with a plurality of longitudinal slots 3, whereby the lower portion of the tube 1 adjacent the threaded part 2 is adapted to be contracted so as to bind against an inner slidable tube 4 and fix the adjustment of the said inner tube 4 relative to the fixed tube 1. A set-collar 5 is provided with a tapered threaded opening 6 and is adapted to be screwed upon the threaded portion 2 of the fixed tube 1 to effect a contraction or compression of the threaded portion 2 about the inner tube 4. The burners will of course be provided upon the inner tube 4 and may be of any number and construction found desirable by the user. In order to prevent the escape of gas, a bushing 7, provided with a reduced threaded end portion 8, is adapted to be screwed to the upper end of the slidable tube 4, and a packing 9 is carried by the reduced portion 8 of the said bushing. The packing 9 is held in position between an annular flange 10, formed upon the reduced portion of the bushing 7, and a ring 11, adapted to be screwed upon the threaded portion of the said bushing to clamp the packing 9 hard against the flange 10, to thereby make a tight joint. Extensions 12 upon the set-collar provide means for manipulating the same, so as to permit adjustment of the slidable tube. When it is desired to either lower or raise the slidable tube 4, the set-collar 5 is slightly unscrewed, so as to permit the above, whereupon the inner tube 4 may be disposed at the proper height, after which the collar is again screwed to its clamping position.

The bushing 7 with the packing 9 constitute a head upon the upper portion of the slidable tube 4 to prevent displacement of the said tube from the fixed tube 2 when the set-collar is screwed upon the lower threaded end portion of the fixed tube. It is thus necessary to entirely remove the collar from the fixed tube in order to withdraw the slidable tube 4 from the same, and this obviates the likelihood of accidental displacement due to any cause which may arise.

Having thus described the invention, what is claimed as new is—

In a chandelier, the combination with a fixed tube having its lower end threaded and provided with longitudinal slots upon the threaded portion thereof, a slidable tube mounted within the fixed tube adapted to carry the light means, the upper end of the slidable tube being threaded, a bushing screwed to the threaded portion of the slidable tube aforesaid and having a reduced end portion provided with threads, an annular flange provided upon the reduced end portion aforesaid, a ring screwed to the threaded part of the reduced end portion of the bushing, a packing-ring interposed between the annular flange and the ring, and a set-collar provided with a tapered threaded opening and adapted to be screwed to the lower threaded end of the fixed tube to effect a contraction or compression of the slotted portions thereof to hold the inner tube at an ascertained adjustment.

In testimony whereof I affix my signature in presence of two witnesses.

WARREN H. KERR. [L. S.]

Witnesses:
   WM. M. ABRAMS, Jr., 2d,
   C. J. NICKUM.